United States Patent
Blackmon et al.

(10) Patent No.: US 7,756,333 B2
(45) Date of Patent: Jul. 13, 2010

(54) DOCUMENT LAYOUT VERIFICATION

(75) Inventors: Steve D. Blackmon, Seattle, WA (US); Matthew J. Winterowd, Seattle, WA (US); Brian G. Stern, Snohomish, WA (US); Chloe Bracis, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1113 days.

(21) Appl. No.: 11/411,620

(22) Filed: Apr. 26, 2006

(65) Prior Publication Data

US 2007/0256010 A1 Nov. 1, 2007

(51) Int. Cl.
*G06K 9/34* (2006.01)

(52) U.S. Cl. .................................. 382/176

(58) Field of Classification Search .............. 382/100, 382/173, 176, 305, 209, 217–220; 707/1–6; 715/209–210, 243–253, 762–765
See application file for complete search history.

(56) References Cited

U.S. PATENT DOCUMENTS

| | | | |
|---|---|---|---|
| 6,178,417 B1 | 1/2001 | Syeda-Mahmood | 707/3 |
| 6,731,775 B1 | 5/2004 | Ancin | 382/100 |
| 6,920,610 B1 * | 7/2005 | Lawton et al. | 715/209 |
| 7,424,672 B2 * | 9/2008 | Simske et al. | 715/243 |
| 2002/0065843 A1 | 5/2002 | Sharma et al. | 715/500 |
| 2002/0116418 A1 | 8/2002 | Lachhwani et al. | 715/517 |
| 2003/0229851 A1 | 12/2003 | Willumeit et al. | 715/513 |
| 2004/0019851 A1 | 1/2004 | Purvis et al. | 715/517 |
| 2004/0205602 A1 | 10/2004 | Croeni | 715/517 |
| 2005/0055635 A1 | 3/2005 | Bargeron et al. | 715/525 |
| 2005/0102628 A1 | 5/2005 | Salesin et al. | 715/764 |
| 2005/0154980 A1 | 7/2005 | Purvis et al. | 715/513 |

FOREIGN PATENT DOCUMENTS

WO     WO 2005/022400 A2     3/2005

OTHER PUBLICATIONS

Maurizio Rigamonti, et al., "A Framework for Cooperative and Interactive Analysis of Technical Documents", http://diuf.unifr.ch/diva/siteDIVA04/publications/xmillumGREC03.pdf.
Tapas Kanungo, et al., "A Statistical, Nonparametric Methodology for Document Degradation Model Validation", http://ieeexplore.ieee.org/search/srchabstract.jsp?arnumber=888707&isnumber=19223&punumber=34&k2dockey=888707@ieeejrns&query=%28+%28+layout+out+validation%3Cin%3Eti+%29+%3Cand%3E+%28+layout++and+validation%3Cin%3Eab+%29+%29&pos=5.

* cited by examiner

*Primary Examiner*—Sherali Ishrat
(74) *Attorney, Agent, or Firm*—Merchant & Gould, P.C.

(57) ABSTRACT

A test document is parsed into components which may include bounding boxes, segments, and points. Test code makes calls to properties and methods of components in order to verify document layout. Rather than take absolute measurements of component placement, components are evaluated relative to each other. Layout verification logic may be part of a larger software test system.

17 Claims, 6 Drawing Sheets

DOCUMENT LAYOUT VERIFICATION

BACKGROUND

In enterprises which design and implement computer software, testing that software can be a tortuous process. As software applications increase in size and complexity, an enterprise may automate the process of software testing, ensuring that incremental software builds work the way they are intended. Using a computer to test software presents a challenge in determining whether application output was properly generated. In the case of applications which work with documents as data, testing application output may involve verifying that the layout of an outputted document is proper.

Existing solutions for verifying the layout of a document created by a software application may include using methods which are inefficient and which may lead to unwanted false negative and/or false positive test results. These methods may include having a person view a document in comparison to a model or master document. Other methods may involve a software module analyzing a test document against a master document, perhaps by performing a pixel-by-pixel analysis. Other methods may involve the comparison of properties of components (e.g., graphics, text, etc) on a test document to the properties of objects on a master document.

FIGS. 2A-2C depict some of the known methods for verifying the layout of test document 202 by comparing it to the layout of model document 201. FIG. 2A depicts the two documents, which may have been electronically rendered (e.g., on a computer screen), electronically stored (e.g., in a data file), transferred to another medium (e.g., printed on paper), and so forth. FIG. 2B depicts the two documents 201 and 202 being inspected on a pixel-by-pixel basis, as shown under magnified views 211 and 212. As can be seen, the two documents, which look to be the same, actually have different pixels with different shades/colors. This may be due to an actual layout error caused by a formatting software application. In addition, this pixel difference may be the result of differences in resolution of the final output (e.g., screen pixel count or printer dots-per-inch (DPI)). Also, such differences may be the result of computer smoothing algorithms such as anti-aliasing. Regardless of source, this pixel difference may result in a negative verification result, even though test document 202 may be adequately similar in layout to model document 201. This result may be considered a false negative. The number of false negative test results can be quite high using a pixel-by-pixel analysis, making such a test ineffective except for the case when pixels are identical.

FIG. 2C provides collections of property values 221 and 222 for components as they are laid out respectively on documents 201 and 202. Here, property values 221 and 222 represent partial descriptions of a circle and an oval (e.g., position, size, color, and so forth) on each of the documents. These components are found on both model document 201 and test document 202. The layout of test document 202 may be verified by comparing the test values 222 to the master values 221. If the values are the same, then a test application presumes that the documents are laid out the same. This presumption may be invalid, as the actual rendering of the document may vary between computers and/or builds of the software application being tested. Moreover, slight numeric variations, as noted in circle center position 225, might lead to false negative results if the final rendition does not vary in a meaningful way.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments provide for verifying a test document produced by a software application. Objects on the test document are parsed into components which provide methods and properties used by test code. Methods perform relative comparisons between components in order to determine a preferred result.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

The foregoing brief summary of the invention, as well as the following detailed description, is better understood when read in conjunction with the accompanying drawings, which are included by way of example, and not by way of limitation with regard to the claimed invention. In the accompanying drawings, the same or similar elements are labeled with the same reference numbers.

DETAILED DESCRIPTION

A software test application may automate the test process, utilizing aliases or indirect references to files in order to abstract their location and prevent problems associated with hard-coded file locations. Additional functionality helps for testing by providing multiple prioritized locations where a file may be found.

Figure 1:
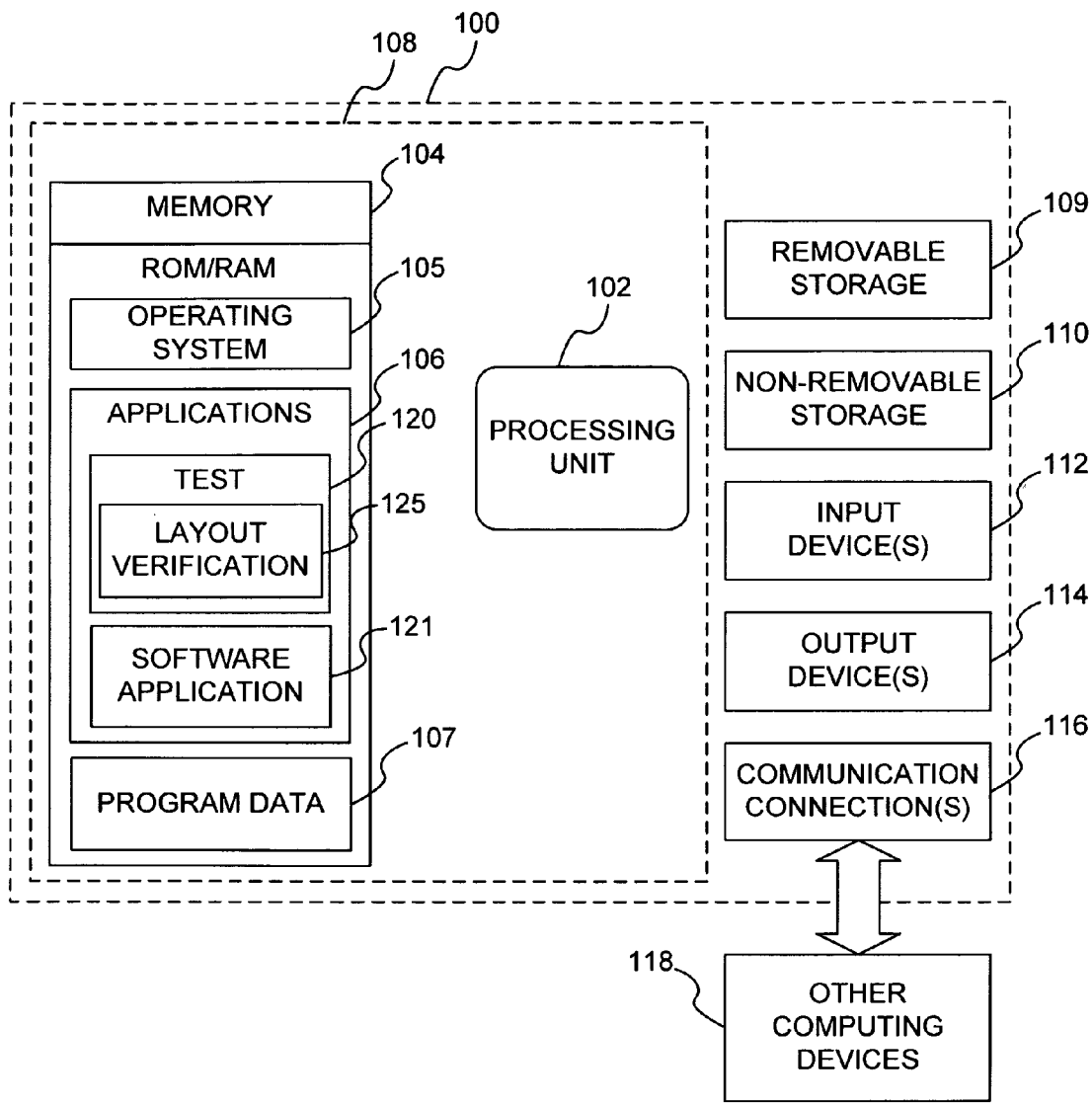
FIG. 1 depicts an example of a computing operating environment.
Figure 2A:
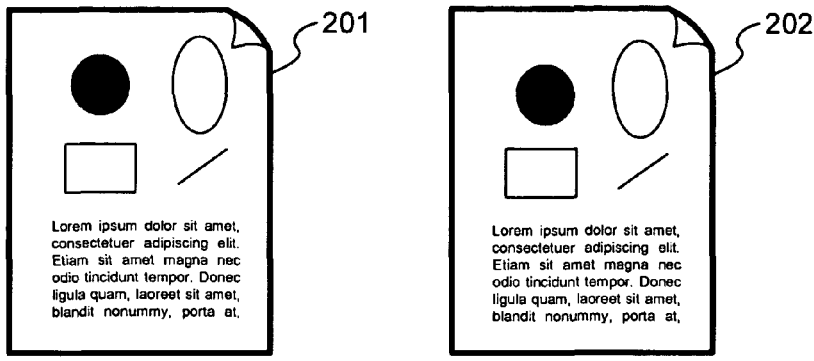
FIGS. 2A-2C depict examples of verifying a test document.
Figure 2A:
Figure 2B:
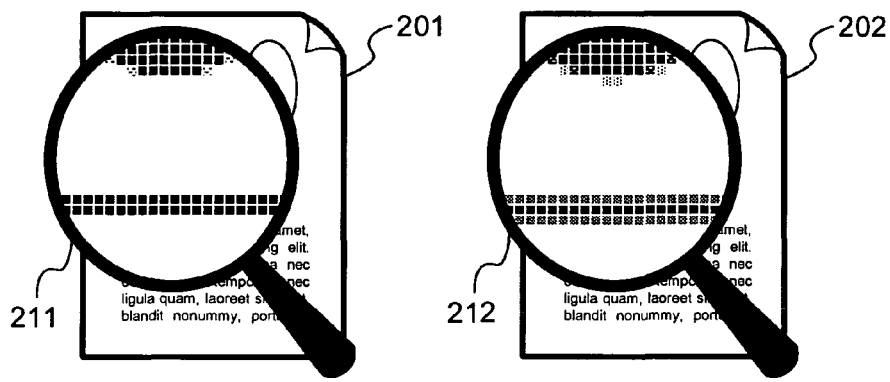
Figure 2B:
Figure 2C:
Figure 2C:
Figure 2C:

With reference to FIG. 1, an embodiment may include a computing device, such as computing device 100. In a basic configuration, computer device 100 may include at least one processing unit 102, and memory 104. Depending on the configuration of the computer device, memory 104 may be volatile (e.g., Random Access Memory (RAM)), non-volatile (e.g., Read-Only Memory (ROM), Flash, etc.), or some combination thereof. Memory 104 may serve as a storage location for operating system 105, one or more applications 106, and may include program data 107, as well as other programs. In some embodiments, applications 106 may include test application 120 and/or software application 121. Test application 120 may include layout verification logic 125.

Although the basic computing device configuration is contained within dashed-line box 108, computing device 100 may include additional features and functionality. For example, computing device 100 may include additional data storage components, including both removable storage 109 (e.g., floppy disks, memory cards, compact disc (CD) ROMs, digital video discs (DVDs), external hard drives, universal serial bus (USB) key drives, etc.) and non-removable storage 110 (e.g., magnetic hard drives).

Computer storage media may include media implemented in any method or technology for storage of information, including computer readable instructions, data structures, program modules, or other data. Memory 104, removable storage 109, and non-removable storage 110 are all examples of computer storage media. Further examples of such media include RAM, ROM, electrically-erasable programmable ROM (EEPROM), flash memory, CD-ROM, DVD, cassettes, magnetic tape, magnetic disks, and so forth. Any such computer storage media may be accessed by components which are a part of computing device 100, or which are external to computing device 100 and connected via a communications link (e.g., Bluetooth, USB, parallel, serial, infrared, etc.). Computing device 100 may also include input devices 112, such as keyboards, mice, pens, microphone, touchpad, touch-display, etc. Output devices 114 may include displays, speakers, printers, and so forth. Additional forms of storage, input, and output devices may be utilized.

Computing device 100 may also include one or more communication connections 116 which allow the computing device to communicate with other computing devices 118, such as over a network (e.g., a local area network (LAN), the Internet, etc.). Communication media, in the form of computer readable instructions, data structures, program modules, or other data in a modulated data signal, may be shared with and by device 100 via communication connection 116. Modulated data signal may mean a signal that has one or more of its characteristics set or changed in such a manner as to encode information in the signal, and may include a modulated carrier wave or other transport mechanism. Communication connection 116 may be comprised of hardware and/or software enabling either a wired (e.g., Ethernet, USB, Token Ring, modem, etc.) or wireless (e.g., WiFi, WiMax, cellular, acoustic, infrared, radio frequency (RF), etc.) communication conduit with other devices 118.

Figure 3:
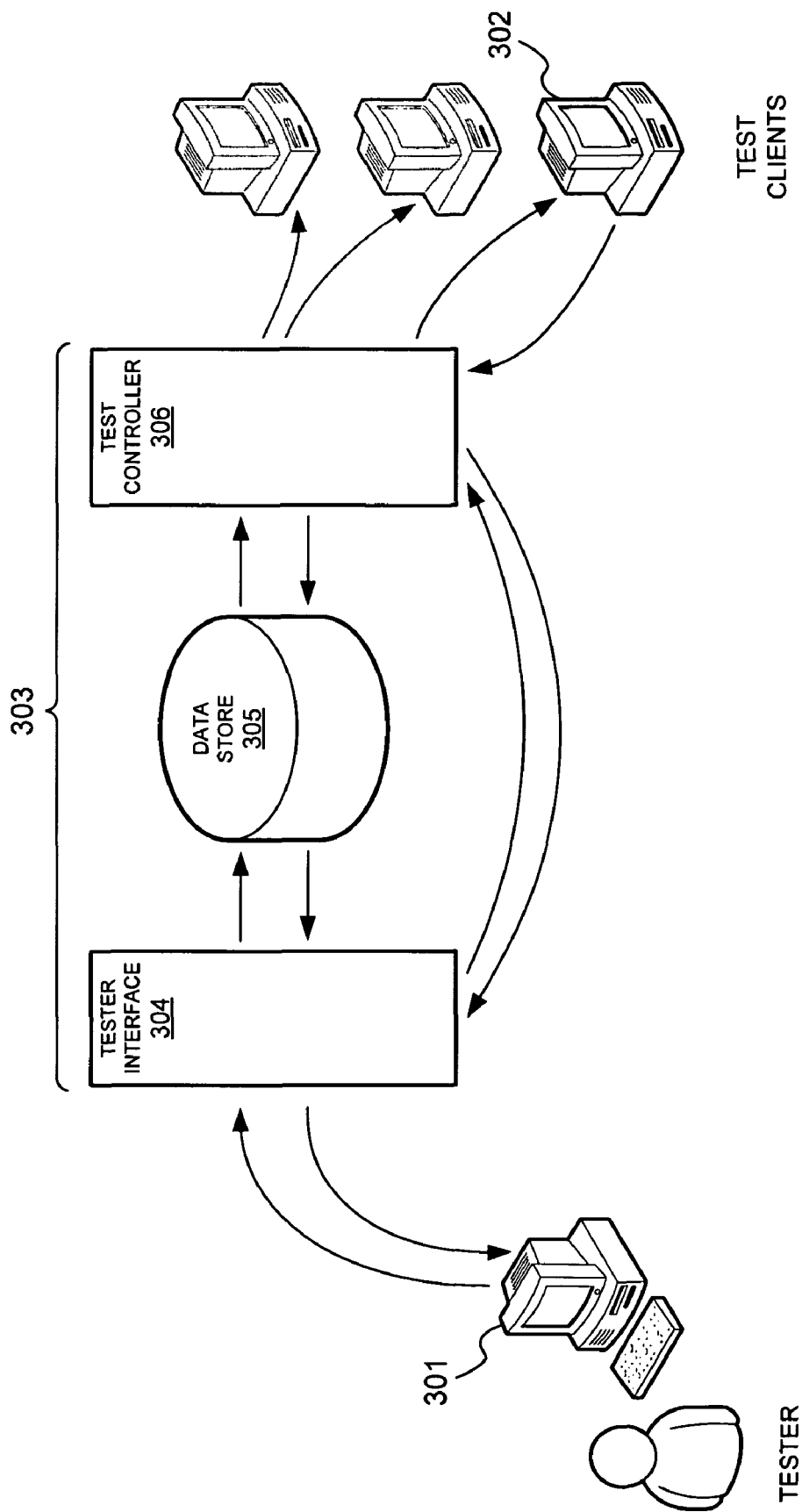
FIG. 3 depicts a system for testing software.

FIG. 3 depicts an example of a system for testing software. The system includes tester machine 301 directing the testing of software application 121 on one or more test clients 302. Tester machine 301 may be operated by a software developer, by a quality assurance (QA) or testing specialist, etc. Tester machine 301 may be the location where a software developer creates software application 121. Likewise, tester machine 301 may be the location where a test writer develops one or more tests for software application 121, tests which operate in conjunction with test application 120. Tests may work only with a specific build or revision of software application 121, or they may work for multiple versions. Each test may only cover a single piece of functionality, or may exercise multiple functions of an application. The test may be written using, for example, a scripting language or a compiled programming language. The test may be written such that it can be distributed to multiple test clients 302 in order to hasten the results.

In some embodiments, tests developed on tester machine 302 may be managed and/or transferred to test clients 302 using test automation system 303. Test automation system 303 may minimally include a tester interface 304, a data store 305, and a test controller 306. Tester interface 304 may be operated as a local software client on tester machine 301. Tester interface 304 may also be operated via a separate server (not shown) and accessed via a network connection. Tester interface 304 may be accessed by a tester using a web browser. A tester may utilize tester interface 304 to upload test files, including test scripts or code, helper files, compiled code, and so forth. A tester may only upload some or all of the files required for a test. The files may be stored in data store 305, or in other locations. Tester interface 304 may allow a tester to specify parameters for a test run, including operating system, processor, build number, number of test clients, helper files, expected results, and so forth. Tester interface 304 may further allow a tester (and others) to initiate a test run, and to view and analyze results of a particular test run.

Data store 305 may be composed of a database system, including a relational database, an object database, or some other form of database (e.g., text files, spreadsheets, etc.). Data store 305 may reside on the same machine as tester interface 304 (including tester machine 301 itself). Data store 305 need not be composed of a single database, but may encompass multiple databases, files, servers, and locations. Data store 305 may store the test run parameters as indicated above and may also store files and data required for a test run. Further, data store 305 may store information about test clients 302, including platform, specifications, and information about past and future test runs. Data store 305 may also store the results of tests, including test data or files outputted by a test run, or performance indicators such as successful completion and time to completion.

Test controller 306 may reside on the same machine as data store 305 (including tester machine 301), or may reside on separate machines in communication with data store 305 and tester interface 304 using a network connection. Other configurations may be available. In a given test environment, more than one test controller 306 may be utilized to dispatch test runs. For example, a given test controller 306 may be responsible for test runs on a particular subset of available test clients 302. Test controller 306 may initiate and track test runs, as provided by a tester via tester interface 304. Test controller 306 may copy all information and files to test clients 302, or may simply pass along a minimal amount of information, and allow test clients 302 to individually copy required files before initiating a test. During and upon completion of a test, each test client 302 may supply feedback and results to test controller 306, which may in turn store feedback and results in data store 305. Likewise, test controller 306 may also communicate to tester interface 304 that a test is running and/or complete so that a tester can be notified of test status.

Although depicted as separate computers in FIG. 3, it should be noted that tester machine 301, test automation system 303, and test clients 302 may all be collocated on the same computer. In addition, the test automation system 303 described here is intended merely as an example. Other test schemes and test environments may also be utilized to implement the subject of the appended claims.

Layout verification logic 125 may be located with test application 120 in memory on test client 302, where it may be used to verify the layout of a document produced or modified by software application 121. Layout verification logic 125 may also be found on other computers, including tester computer 201, where it may be used in the course of designing a test script for use in conjunction with test application 120. The logic may be accessed through an application programming interface (API). The API may be utilized through an object oriented programming environment, or via other programming platforms.

Figure 4:
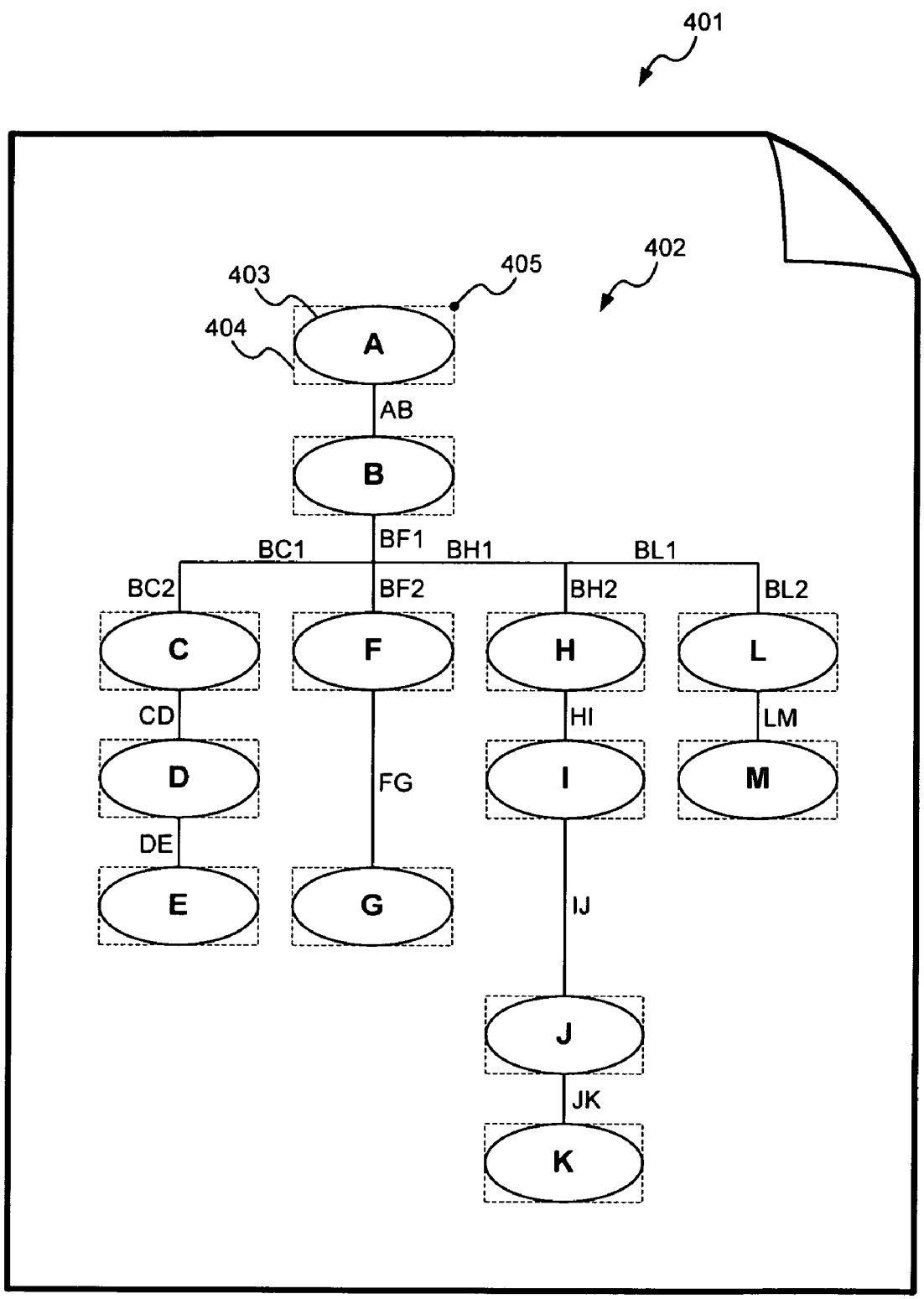
FIG. 4 depicts a test document.

FIG. 4 depicts a document 401 which may be created or modified by software application 121. Software application 121 may include any application which can produce or modify a document layout. Examples of software application 121 include a word processor, a photo editor, a vector graphics editor, a presentation editor, a report writer, a spreadsheet program, and so forth. Document 401 may include a word processing document, a set of presentation slides, a database report, and so forth.

Here, document 401 may be stored in volatile memory within test client 302 or in non-volatile storage such as a hard drive. Document 401 may be formatted as a rasterized image (e.g., bitmap), a vector graphic (e.g., scalable vector graphic (SVG)), a markup language document (e.g., Hypertext Markup Language (HTML)) or another format which includes information sufficient to replicate the document. Prior to verifying the layout of document 401, the document may be converted from one format to another. Examples of such conversions include: converting a proprietary word processing document format to an extensible markup language (XML) format; scanning a rasterized format (e.g., a screen capture) in order to recognize and store information about the components 402 of document 401; and loading a drawing file from non-volatile memory and extracting information about the components 402 which are found on document 401 for storage in volatile memory.

Document components 402 may include any distinct item appearing on document 401. The layout of components on document 401 constitutes a structure similar to an organizational chart. Here, each oval (e.g., oval 403) represents a distinct component. Connecting segments (e.g., segment AB) also represent distinct components. Although distinct in this representation, components need not be whole objects as depicted here, but may include portions of objects or collections of multiple objects.

Prior to utilizing layout verification logic 125, document 401 may be parsed into components 402, including ovals and segments. In determining components, data underlying a document representation may be examined in order to extract information about components (e.g., name, size, position, color, etc). This underlying data may be in the form of XML formatted object descriptions, or other types of object descriptions. Alternatively, component information may be extracted by analyzing the pixels, points, or other graphical unit of a displayable or printable version of document 401. Optical recognition algorithms may be used to distinguish components from each other and reconstruct underlying data about objects.

Once components are distinguished, each component may be evaluated to determine a set of common features for use by verification functions. These common features may include a bounding box, segments, and points of interest. A bounding box may be represented by a rectangle sized to the outermost points of a particular component. For example, oval 403 has a bounding box 404 as shown. Segments associated with oval 403 may include the four sides of bounding box 404. And points of interest associated with oval 403 may include corner point 405, as well as other points such as a center point associated with the component. Other features associated with components may include an object identifier or name, object text (e.g., "A" in the case of oval 403), color, fill pattern, and so forth. Verification functions may work with bounding boxes, segments, and points, along with other objects when determining whether the layout of document 401 is proper. Verification functions may deal with all components generally, and may also include component-type specific functions which may be evaluated using, for example, shape specific geometry.

The document's determined components may be exposed to test application 120 as a collection of programming objects for use by layout verification logic 125. Each programming object may include a series of methods for use by layout verification logic 125. These methods may be utilized to compare component properties relative to each other to ensure alignment, position, etc. are proper. Using relative property values enables layout verification to be self-contained in that the use of a model document is not needed. This may prevent false negatives when absolute values are not required to be exact, and rather relative positioning of components provides adequate test results. This may also enable one test script to be written which works across products, builds, versions, operating systems, hardware platforms, screen and/or print resolutions, and so forth. Such methods may be used alone to verify document layout, or may be used in conjunction with other verification methods.

In the context of document 401, object methods associated with components 402 may be utilized by layout verification logic 125 to verify document layout. A test script author can utilize components 402 and their associated object methods to write test code which verifies placement of objects relative to each other, among other verification methods. Examples of object methods are provided below.

When parsing the components of document 401, a collection of components may be created which are accessible by test code. These components may come in several classes or varieties, including LayoutElements (collection), LayoutElement, Boundingbox, Segment, and Point. The class names provided are used as examples, and other names and class types may be utilized.

A LayoutElements collection serves as a collector class for the LayoutElement class. Instances of LayoutElements may provide properties and methods for searching and filtering LayoutElement instances. The listing below presents examples of class properties and/or methods available via a LayoutElements collection. Unless otherwise stated, methods return instances or arrays of instances of the classes preceding the method name. The listing presents only a partial list of methods and/or properties available from the LayoutElements collection.

LayoutElements Collection Properties & Methods

LayoutElement BottomMost {get;}—returns the bottommost element in the collection. Bottommost (and other functions) may be evaluated as against the position on the document, independent of whether coordinate values increases or decreases top to bottom.

Boundingbox Boundingbox {get;}—returns a bounding box encompassing the entire collection of elements.

LayoutElement LeftMost {get;}—returns the leftmost element in the collection.

LayoutElement RightMost {get;}—returns the rightmost element in the collection.

LayoutElement TopMost {get;}—returns the topmost element in the collection.

bool AreAbove(LayoutElement[ ] elements)—returns true or false indicating whether the elements in the collection are above the array of elements passed in. This function may be evaluated by determining whether the bottommost points of each of the elements in the collection are above the topmost point of each of the array of elements passed in. Other similar functions may be evaluated in a similar fashion. In an alternative embodiment, this function and similar functions may be evaluated using the relative location of center points only.

bool AreBelow(LayoutElement[ ] elements)—returns true or false indicating whether the elements in the collection are below the array of elements passed in.

bool AreCenterAligned(Slope slope, double maxDeviation)—returns true or false indicating whether the centers of the elements in the collection are aligned within a specified deviation amount along a line parallel to the slope. The maxDeviation value may be a decimal or an integer and may vary depending on the unit being used by the hardware platform, operating system, or software application being tested.

bool AreLeftOf(LayoutElement[ ] elements)—returns true or false indicating whether the elements in the collection are to the left of the array of elements passed in.

bool AreRightOf(LayoutElement[ ] elements)—returns true or false indicating whether the elements in the collection are to the right of the array of elements passed in.

bool Contains(LayoutElement value)—returns true or false indicating whether the passed in value is a member of this collection of elements.

LayoutElements ElementsCoincidentWith(Boundingbox box)—returns a sub-collection of elements from the collection which are completely or partially contained within the passed in bounding box.

LayoutElements ElementsContainedWithin(Boundingbox box)—returns a sub-collection of elements from the collection which are completely contained within the passed in bounding box.

LayoutElements ElementsWithAreaLargerThan(LayoutElement subject)—returns a sub-collection of elements from the collection which have areas larger than that of the subject. Area for this and other functions below may include the area of a component shape, or the area of the component's bounding box.

LayoutElements ElementsWithAreaSmallerThan(LayoutElement subject)—returns a sub-collection of elements from the collection which have areas smaller than that of the subject.

LayoutElements ElementsWithHeightGreaterThan(LayoutElement subject)—returns a sub-collection of elements from the collection which have a height greater than that of the subject.

LayoutElements ElementsWithHeightLessThan(LayoutElement subject)—returns a sub-collection of elements from the collection which have a height less than that of the subject.

LayoutElements ElementsWithWidthGreaterThan(LayoutElement subject)—returns a sub-collection of elements from the collection which have a width greater than that of the subject.

LayoutElements ElementsWithWidthLessThan(LayoutElement subject)—returns a sub-collection of elements from the collection which have a width greater than that of the subject.

LayoutElements GetElementsNameContains(string name)—returns a sub-collection of elements from the collection which have a name containing the string. This function may or may not consider case-sensitivity when determining string containment.

A LayoutElement may consist of a Boundingbox, with the addition of a unique identifier and/or a name. As such, the LayoutElement class may extend the Boundingbox class. A name may be determined based on any labels or properties applied to the object in question. A Boundingbox may represent a boundary surrounding the object, such as box 404. A Boundingbox may be composed of four Segments connected to form a quadrangle, and the quadrangle may be aligned with coordinate axes such that each set of opposing sides are parallel to one of the axes. A Boundingbox class may provide properties and methods for accessing Segments, Points, and other Boundingboxes associated with the underlying object, in addition to other relevant methods for comparing instances of Boundingbox and providing information such as height, width, area, and so forth.

The listing below presents examples of class properties and/or methods available via a Boundingbox instance. Unless otherwise stated, methods return instances or arrays of instances of the classes preceding the method name. The listing presents only a partial list of methods and/or properties available for a Boundingbox instance.

Boundingbox Properties & Methods

Point BottomLeftPoint {get;}—returns a point representing the bottom left corner of the box.

Point BottomRightPoint {get;}—returns a point representing the bottom right corner of the box.

Segment BottomSegment {get;}—returns a segment representing the bottom portion of the box.

Point CenterPoint {get;}—returns a point representing the center of the box.

Segment LeftSegment {get;}—returns a segment representing the left portion of the box.

Segment RightSegment {get;}—returns a segment representing the right portion of the box.

Point TopLeftPoint {get;}—returns a point representing the top left corner of the box.

Point TopRightPoint {get;}—returns a point representing the top right corner of the box.

Segment TopSegment {get;}—returns a segment representing the top portion of the box.

bool Contains(Boundingbox[ ] boxes)—returns true or false indicating whether the box fully contains all of the boxes passed in.

Boundingbox Intersection(Boundingbox box)—returns a box representing the new box created by the overlap of two boxes.

bool IsAbove(Boundingbox[ ] boxes)—returns true or false indicating whether the box is above all of the boxes passed in.

bool IsBelow(Boundingbox[ ] boxes)—returns true or false indicating whether the box is below all of the boxes passed in.

bool IsBottomAlignedWith(double maxDeviation, Boundingbox[ ] boxes)—returns true or false indicating whether the box is aligned along the bottom side with the bottom sides of all of the boxes passed in, within a certain deviation.

bool IsCenterAlignedWith(Slope slope, double maxDeviation, Boundingbox[ ] boxes)—returns true or false indicating whether the box's center point is aligned along a line parallel to slope with all of the center points of the boxes passed in, within a certain deviation.

bool IsLeftAlignedWith(double maxDeviation, Boundingbox[ ] boxes)—returns true or false indicating whether the box is aligned along the left side with the left sides of all of the boxes passed in, within a certain deviation.

bool IsLeftOf(Boundingbox[ ] boxes)—returns true or false indicating whether the box is to the left of all of the boxes passed in.

bool IsRightAlignedWith(double maxDeviation, Boundingbox[ ] boxes)—returns true or false indicating whether the box is aligned along the right side with the right sides of all of the boxes passed in, within a certain deviation.

bool IsRightOf(Boundingbox[ ] boxes)—returns true or false indicating whether the box is to the right of all of the boxes passed in.

bool IsTopAlignedWith(double maxDeviation, Boundingbox[ ] boxes)—returns true or false indicating whether the box is aligned along the top side with the top sides of all of the boxes passed in, within a certain deviation.

As noted above, a Boundingbox may consist of four Segments, each representing a side of the box. A Segment class may provide properties and methods for accessing Segments, Points, and other objects associated with the underlying object, in addition to other relevant methods for comparing instances of Segment and providing information such as length, orientation, and so forth. The listing below presents examples of class properties and/or methods available via a Segment instance. Unless otherwise stated, methods return instances or arrays of instances of the classes preceding the method name. The listing presents only a partial list of methods and/or properties available for a Segment instance.

Point Center {get;}—returns a point representing the midpoint of the segment.

Point Head {get;}—returns a point representing a head end of the segment.

bool IsHorizontal {get;}—returns true or false indicating whether the segment is horizontal.

bool IsVertical {get;}—returns true or false indicating whether the segment is vertical.

double Length {get;}—returns a number representing the length of the segment.

Slope Slope {get;}—returns a slope object representing the slope of the segment.

Point Tail {get;}—returns a point representing a tail end of the segment.

double Angle(Segment segment)—returns a number representing the angle between two segments.

bool Includes(Point[ ] points)—returns true or false indicating whether all the points in the array are included in the segment.

Point Intersection(Segment segment)—returns a point representing the intersection of two segments.

bool IsAbove(Segment[ ] segments)—returns true or false indicating whether the segment is above all of the segments passed in.

bool IsBelow(Segment[ ] segments)—returns true or false indicating whether the segment is below all of the segments passed in.

bool IsColinearWith(double maxDeviation, Segment[ ] segments)—returns true or false indicating whether the segment is collinear with all of the segments passed in, within a certain max deviation. Collinear generally means falling upon the same line or in a state of alignment.

bool IsLeftOf(Segment[ ] segments)—returns true or false indicating whether the segment is to the left of all of the segments passed in.

bool IsRightOf(Segment[ ] segments)—returns true or false indicating whether the segment is to the right of all of the segments passed in.

Point PointAtX(double x)—returns the point along the segment having an x-coordinate matching the x value passed in.

Point PointAtY(double y)—returns the point along the segment having an y-coordinate matching the y value passed in.

double ShortestDistanceTo(Point point)—returns a number representing the shortest distance between the segment and a nearby point.

Segments, Boundingboxes, and other components consist of a set of Points. A Point class may provide properties and methods for accessing Segments, Points, and other objects associated with the underlying point, in addition to other relevant methods for comparing instances of Point. The listing below presents examples of class properties and/or methods available via a Point instance. Unless otherwise stated, methods return instances or arrays of instances of the classes preceding the method name. The listing presents only a partial list of methods and/or properties available for a Point instance.

double X {get;}—returns a number representing the x-coordinate of the point.

double Y {get;}—returns a number representing the y-coordinate of the point.

Point BottomPoint(Point[ ] points)—returns the bottommost point from a collection of points passed in.

double DistanceFrom(Point point)—returns a number representing the distance from the point to the point passed in.

double DistanceXFrom(Point point)—returns a number representing the distance in the direction of the x-axis from the point to the point passed in.

double DistanceYFrom(Point point)—returns a number representing the distance in the direction of the y-axis from the point to the point passed in.

bool IsAbove(Point[ ] points)—returns true or false indicating whether the point is above all of the points passed in.

bool IsBelow(Point[ ] points)—returns true or false indicating whether the point is below all of the points passed in.

bool IsColinearWith(double maxDeviation, Point[ ] points)—returns true or false indicating whether the point is colinear with all of the points passed in, within a certain max deviation.

bool IsColinearWith(Slope slope, double maxDeviation, Point[ ] points)—returns true or false indicating whether the point is colinear along a slope with all of the points passed in, within a certain max deviation.

bool IsHorizontallyAlignedWith(double maxDeviation, Point[ ] points)—returns true or false indicating whether the point is horizontally aligned with all of the points passed in, within a certain max deviation.

bool IsLeftOf(Point[ ] points)—returns true or false indicating whether the point is to the left of all the points passed in.

bool IsRightOf(Point[ ] points)—returns true or false indicating whether the point is to the right of all the points passed in.

bool IsVerticallyAlignedWith(double maxDeviation, Point[ ] points)—returns true or false indicating whether the point is vertically aligned with all of the points passed in, within a certain max deviation.

Point LeftPoint(Point[ ] points)—returns the leftmost point from a collection of points passed in.

Point RightPoint(Point[ ] points)—returns the rightmost point from a collection of points passed in.

Point TopPoint(Point[ ] points)—returns the topmost point from a collection of points passed in.

Other objects, classes, and elements may be used to describe and/or encapsulate the contents of document 401. Those provided here are merely one example of classes, methods, and properties which may be used.

When a test script author has designed a test to have software application 121 create or modify document 401, the author may utilize methods exposed by the objects described above to confirm that document 401 is properly laid out. Layout verification logic 125 may be instantiated as an object, and document 401 may be processed as described above.

Figure 5:
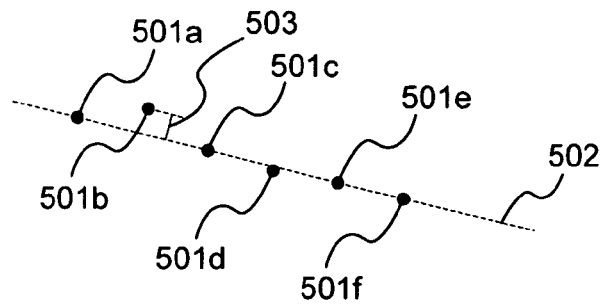
FIGS. 5-7 depict examples of document component comparisons.
Figure 6:
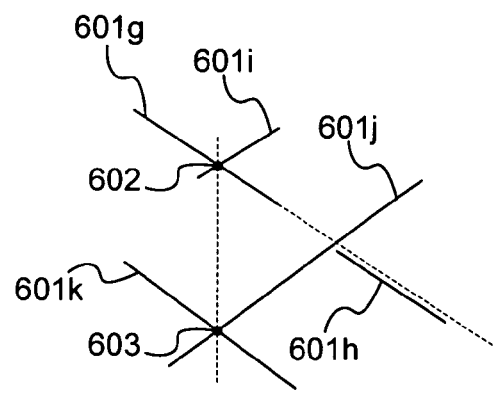
Figure 7:
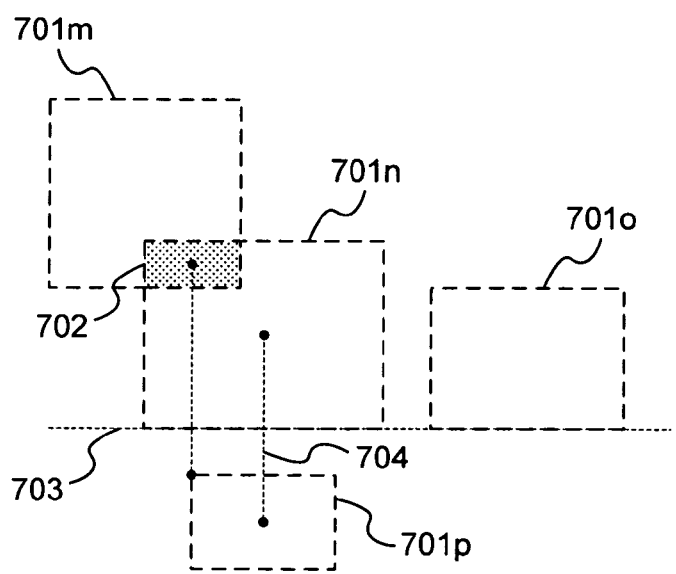

Document 401 may include components similar to those displayed in FIGS. 5-7. Layout verification logic 125 may be used to confirm the relative location of each component. FIG. 5 depicts a series of points 501 which may appear on document 401. These points may represent merely points, or may represent corners or center points of other objects. The points (or corresponding objects) may have been automatically drawn by software application 121 under the direction of a test script. The test script may then analyze document 401 as the product of software application 121, and utilize the specified layout requirements to establish whether or not the application passes the test.

A test author may wish to determine whether points 501 are colinear—whether they fall along a line 502. In determining colinearity, points may not be precisely in line, as with point 501*b*. Thus, a deviation parameter in the test function may allow for points to be "close enough" to be considered colinear. Such a deviation parameter may account for the distance 503 between 501*b* and line 502. Code snippet (1) below is a sample line of code which may be used to log the results of the test for colinearity. The single letters correspond to instances of Point objects corresponding to each of the points.

Log.Verify(a.IsColinearWith(0.05, {b,c,d,e,f})); (1)

Here, point 501*a* is used to determine whether points 501*b*-501*f* are colinear with 501*a*, with a max deviation of 0.05. The Log object or class may be used as a receptacle for verification results, or may otherwise store or communicate verification results. The result of the verification in code snippet (1) may be placed in test results which may then be used by a test author or software developer to either confirm a build, or rewrite the code to make it work properly.

FIG. 6 depicts a collection of segments 601. Each may have a corresponding instance of a Segment object. These objects can be utilized to verify their layout relative to each other. For example, code snippet (2) below may be used to log the results of the test for segment colinearity.

Log.Verify(g.IsColinearWith(0.05, {h})); (2)

Code snippet (3) below is an example of how test code can be compounded to find complex test results. Points 602 and 603 are determined based on the intersections of segments 601*g* and 601*j* with segments 601*i* and 601*k* respectively. Points 602 and 603 are then evaluated to determine whether they are vertically aligned with each other.

Log.Verify(g.Intersection(i).IsVerticallyAlignedWith
   (0.05, {j.Intersection(k)})); (3)

FIG. 7 depicts a set of Boundingboxes 701 possibly located on document 401. Boundingboxes 701 may be associated with underlying objects such as text blocks, drawing objects, photos, and so forth. As with the examples above, the objects may be utilized to analyze the relative location of objects to each other. Below are several examples of test code which are explained further down.

Log.Verify(n.IsBottomAlignedWith(0.05, {o})); (4)

Log.Verify(n.Intersection(m).getCenterPoint.IsVertically AlignedWith(p.getTopLeftPoint(p)); (5)

Log.Verify(n.IsCenterAlignedWith(VerticalSlope,
   0.05, {p})); (6)

Code snippet (4) determines whether Boundingbox 701*n* is bottom aligned with Boundingbox 701*o*. Code snippet (5) determines whether the box formed by the intersection of boxes 701*n* and 701*m* has a center point aligned with the top left corner of box 701*p*. Code snippet (6) determines whether box 701*n* is center aligned with box 701*p*.

Placing calls to layout verification logic 125 in code similar to the above samples provides a method for tracking the results of document manipulation. Because the verification is relative to internal objects, and not to some model document, some advantages may be realized, including minimizing the maintenance of test code and master documents. Relative verification means that slight or unimportant changes in the manipulated document (e.g. slight shifting of objects) do not require a new revision of a model document. Moreover, no absolute values are required to be exactly correct, if all components on a document shift uniformly, relative verification may produce the same outcome regardless. In addition, by placing layout verification in test code, it can easily be tracked as part of the source code and does not require separate verification documents and tools. Creation of test scripts can actually begin before an application progresses to a point where test documents can be created. By knowing the definition of how document components should be composed relative to each other, a test script can be written in the absence of a master document. In addition, testers do not need in-depth knowledge of the workings of a product to be able to generate useful test cases.

Figure 8:
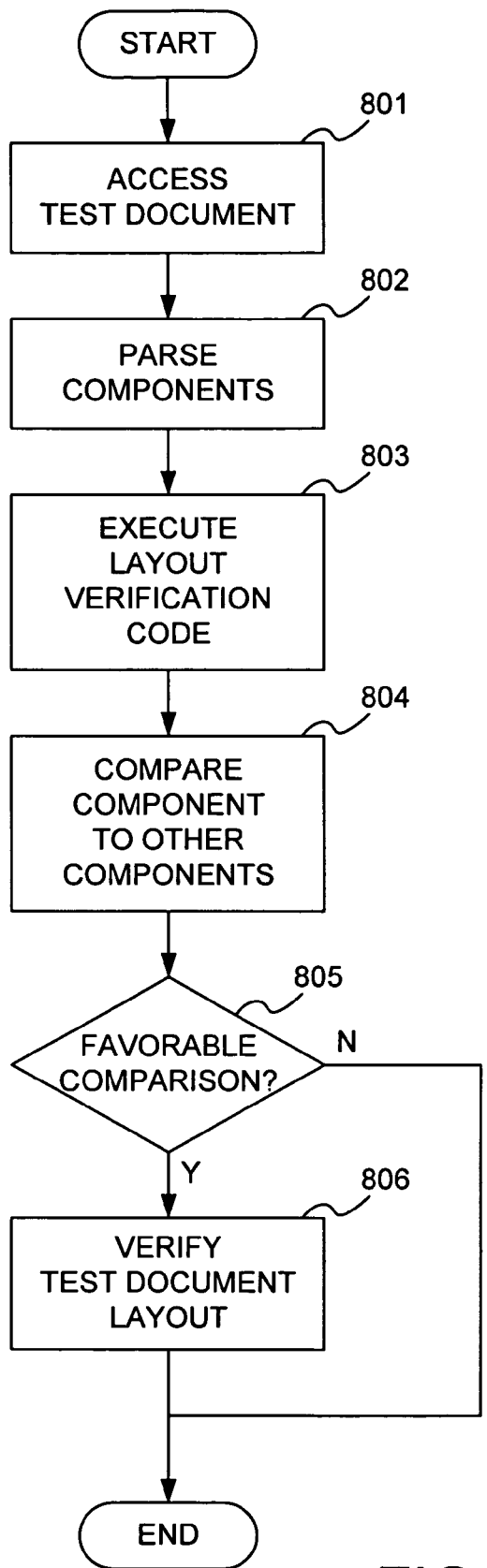
FIG. 8 depicts a method for verifying a document layout.

FIG. 8 depicts a method for verifying a document layout. Initially, at 801, a test document is accessed, perhaps by loading the document into memory. At 802, the components of the document are parsed. This may occur using optical recognition techniques, or by accessing the underlying data for the test document and retrieving location, size, and other data about contents of the document. These components may be parsed into some combination of Boundingboxes, Segments, and Points, although other types of components may be used. Components may be loaded as objects in memory. At 803, test code written to evaluate the layout of the test document is executed. This code uses methods and properties of the components previously parsed to verify layout.

At 804, as the test code is executed, components are compared to each other. This comparison may involve comparing locations of center Points, bottom Segments, overlapping Boundingboxes, and so forth. Other comparisons may be used. At 805, if the components of the test document produce favorable test results, then at 806, the layout of the test document may be deemed verified. If at 805, some test fails, then the failure may be logged.

While methods and systems embodying the present invention are shown by way of example, it will be understood that the invention is not limited to these embodiments. The methods and systems described are merely examples of the invention, the limits of which are set forth in the claims which follow. Those skilled in the art may make modifications, particularly in light of the foregoing teachings.

We claim:

1. A computer-implemented method for verifying a layout of a test document, the method comprising:

receiving the test document for layout verification, wherein the test document comprises a first component and a second component;

causing a computer processor to perform a relative comparison of a property of the first component with a corresponding property of the second component, wherein the relative comparison includes comparing relative locations of a point on the first component to a corresponding point on the second component;

verifying that the relative comparison produces a preferred result, wherein the preferred result includes at least one member of a group comprising: the point and the corresponding point being situated approximately along a same coordinate axis, the point and the corresponding point being situated approximately along a line having a specified slope value, and the point and the corresponding point being situated approximately along a same axis within a supplied deviation distance; and performing additional relative comparisons in order to verify the layout of the test document.

2. The computer-implemented method of claim 1, wherein the first and second components comprise one of a drawing item, a text block, and an image.

3. The computer-implemented method of claim 1, wherein:
the first component and the second component comprise bounding boxes.

4. The computer-implemented method of claim 1, wherein:
the first component and the second component comprise segments.

5. The computer-implemented method of claim 1, wherein:
the first component and the second component comprise points.

6. The computer-implemented method of claim 1, further comprising:
executing a software application in a test environment, wherein the software application produces the test document; and
storing the test document in memory.

7. A system for verifying a layout of a test document, wherein the system comprises:
at least one processor;
at least one memory, storing instructions executable by the processor, wherein the instructions comprise:
executing a software application within a test environment;
modifying a test document in the course of executing the software application;
storing the test document;
parsing the components of the test document;
executing test code to verify the layout of the test document;
performing a relative comparison of a first component to a second component, wherein performing a relative comparison includes comparing a first point on the first component with a second point on the second component and determining whether the first point and the second point are collinear; and
verifying that the comparison produces a favorable result.

8. The system of claim 7, further comprising:
a network interface, wherein the network interface enables communication between the processor and a remote computer;
receiving the test code from the remote computer; and
sending results of verifying the layout of the test document to the remote computer.

9. The system of claim 8, wherein performing a relative comparison further includes comparing the first point on the first component to a third point on a third component.

10. The system of claim 7, wherein:
the first component and the second component comprise bounding boxes.

11. The system of claim 7, wherein:
the first component and the second component comprise segments.

12. The system of claim 7, wherein:
the first component and the second component comprise points.

13. A non-transitory computer-readable storage medium having computer executable instructions for verifying a layout of a test document, the instructions comprising:
receiving the test document for layout verification, wherein the test document comprises a first component and a second component;
performing a relative comparison of a property of the first component with a corresponding property of the second component, wherein the relative comparison includes comparing relative locations of a point on the first component to a corresponding point on the second component; and
verifying that the relative comparison produces a preferred result, wherein the preferred result includes at least one member of a group comprising: the point and the corresponding point being situated approximately along a same coordinate axis, the point and the corresponding point being situated approximately along a line having a specified slope value, and the point and the corresponding point being situated approximately along a same axis within a supplied deviation distance.

14. The non-transitory computer-readable storage medium of claim 13, wherein the first and second components comprise one of a drawing item, a text block, and an image.

15. The non-transitory computer-readable storage medium of claim 13, wherein:
the first component and the second component comprise bounding boxes.

16. The non-transitory computer-readable storage medium of claim 13, wherein:
the first component and the second component comprise segments.

17. The non-transitory computer-readable storage medium of claim 13, wherein:
the first component and the second component comprise points.

* * * * *